(12) United States Patent
Chen

(10) Patent No.: US 8,707,983 B1
(45) Date of Patent: Apr. 29, 2014

(54) PUSH TYPE WATER TAP WITH AUTOMATIC CLOSING FUNCTIONS

(75) Inventor: Frank Kee-Suo Chen, Changhua (TW)

(73) Assignee: Crescent Plumbing, Inc., Shianshi Shang, Changhua (TW)

( * ) Notice: Subject to any disclaimer, the term of this patent is extended or adjusted under 35 U.S.C. 154(b) by 210 days.

(21) Appl. No.: 13/222,194

(22) Filed: Aug. 31, 2011

(51) Int. Cl.
- *F16K 5/00* (2006.01)
- *F16K 27/06* (2006.01)
- *F16K 43/00* (2006.01)
- *E03C 1/04* (2006.01)

(52) U.S. Cl.
USPC ............... 137/315.12; 251/50; 251/54; 4/678

(58) Field of Classification Search
USPC ............ 137/315.12; 251/12, 48, 50, 54, 318, 251/319, 321, 322; 4/675, 676, 677, 678
See application file for complete search history.

(56) References Cited

U.S. PATENT DOCUMENTS

| | | | |
|---|---|---|---|
| 7,694,935 B2 * | 4/2010 | Wang | 251/54 |
| 2006/0202138 A1 * | 9/2006 | Yeh | 251/15 |

* cited by examiner

*Primary Examiner* — John K Fristoe, Jr.
*Assistant Examiner* — Kevin Barss
(74) *Attorney, Agent, or Firm* — Egbert Law Offices, PLLC

(57) ABSTRACT

A push type water tap with automatic closing functions wherein a through valve tube and a protruding bottom tube are set separately into the chambers of the main body. A lifting valve lever is assembled into the valve tube and bottom tube. A stop ring can be abutted onto the water stop ring flange for stopping water supply. A restoring spring is set between the top of the valve lever and the lock-joining seat, and supports the valve lever and the push button. A single-way check ring is sleeved on the bottom of the valve lever to keep contact with the wall of the bottom tube. A resettable regulating space is formed by the gap between the bottom of the valve lever and the sealing surface. A resettable regulating water channel is set on the bottom of the valve lever to guide water into the regulating space.

3 Claims, 8 Drawing Sheets

PUSH TYPE WATER TAP WITH AUTOMATIC CLOSING FUNCTIONS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a water tap structure, and more particularly to an innovative one which is a push type for fine-tuning during water release with automatic closing functions.

2. Description of Related Art Including Information Disclosed Under 37 CFR 1.97 and 37 CFR 1.98

Conventional water taps are operated manually to control the opening and closing, however, waste of water resources is caused if the water tap is not closed due to poor habits of the users in public settings.

For this reason, a push type water tap with automatic closing functions has been developed. According to the structural design of the push type water tap, a push button is set on the main body of the water tap, enabling upward resetting with the bracing of a spring when pressing the push button. While the push button is actuated, a check valve at its bottom is driven to cause water stop and supply. Moreover, a single-way check ring is set at the bottom of the check valve to postpone automatic closing or discharge.

However, some shortcomings are still observed during actual applications of said push type water tap with automatic closing functions. For instance, the actuating time from pushing to resetting of the push button is fixed, so water discharge cannot be adjusted randomly, making it difficult to meet diversified user demands due to limited functionality.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the innovative structure of the present invention wherein the main body of the push type water tap allows for combination of said resettable regulating space, resettable regulating water channel, holding groove and flow regulating screw, the water discharge time of the push type water tap can be adjusted to meet diversified operating demands, thus improving greatly the functionality and quality of the push type water tap with better applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
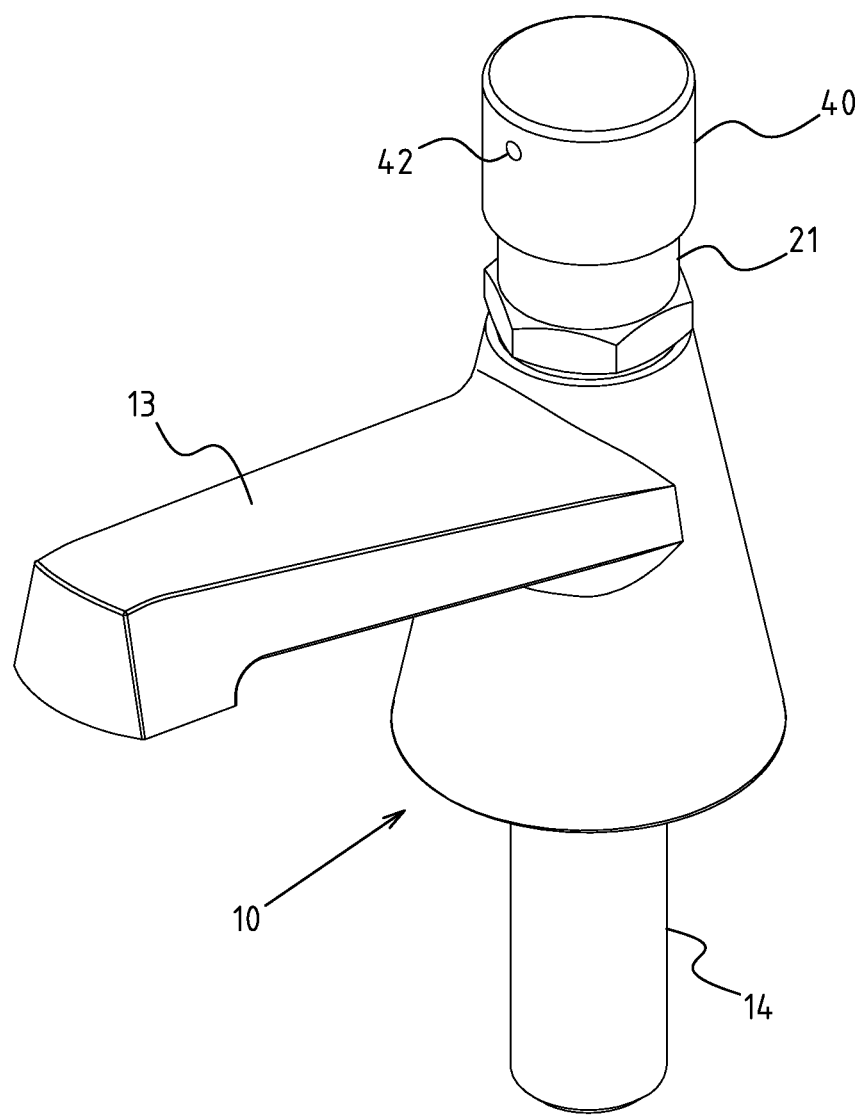
FIG. 1 is an assembled perspective view of the preferred embodiment of the present invention.
Figure 2:
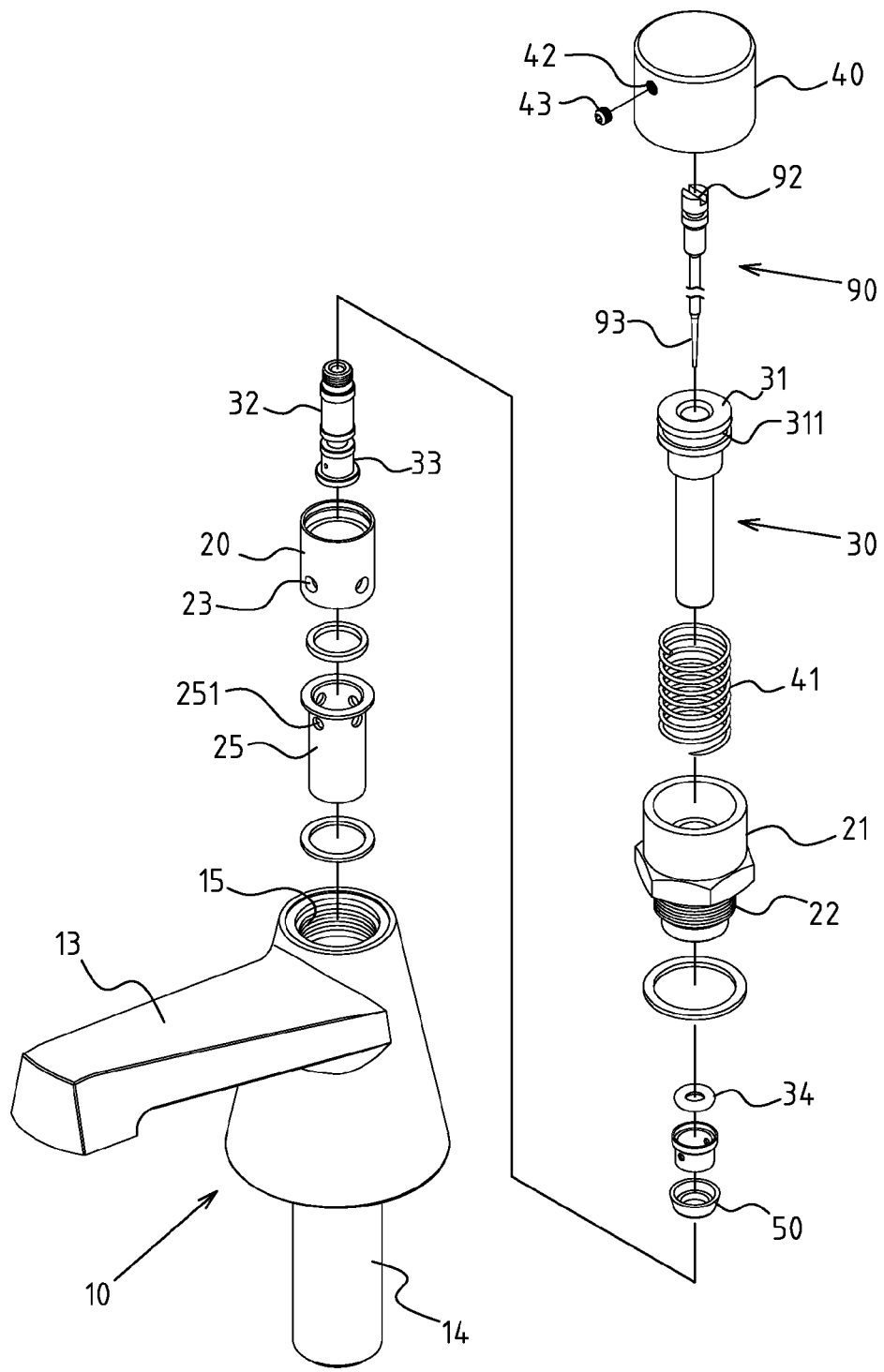
FIG. 2 is an exploded perspective view of the preferred embodiment of the present invention.
Figure 3:
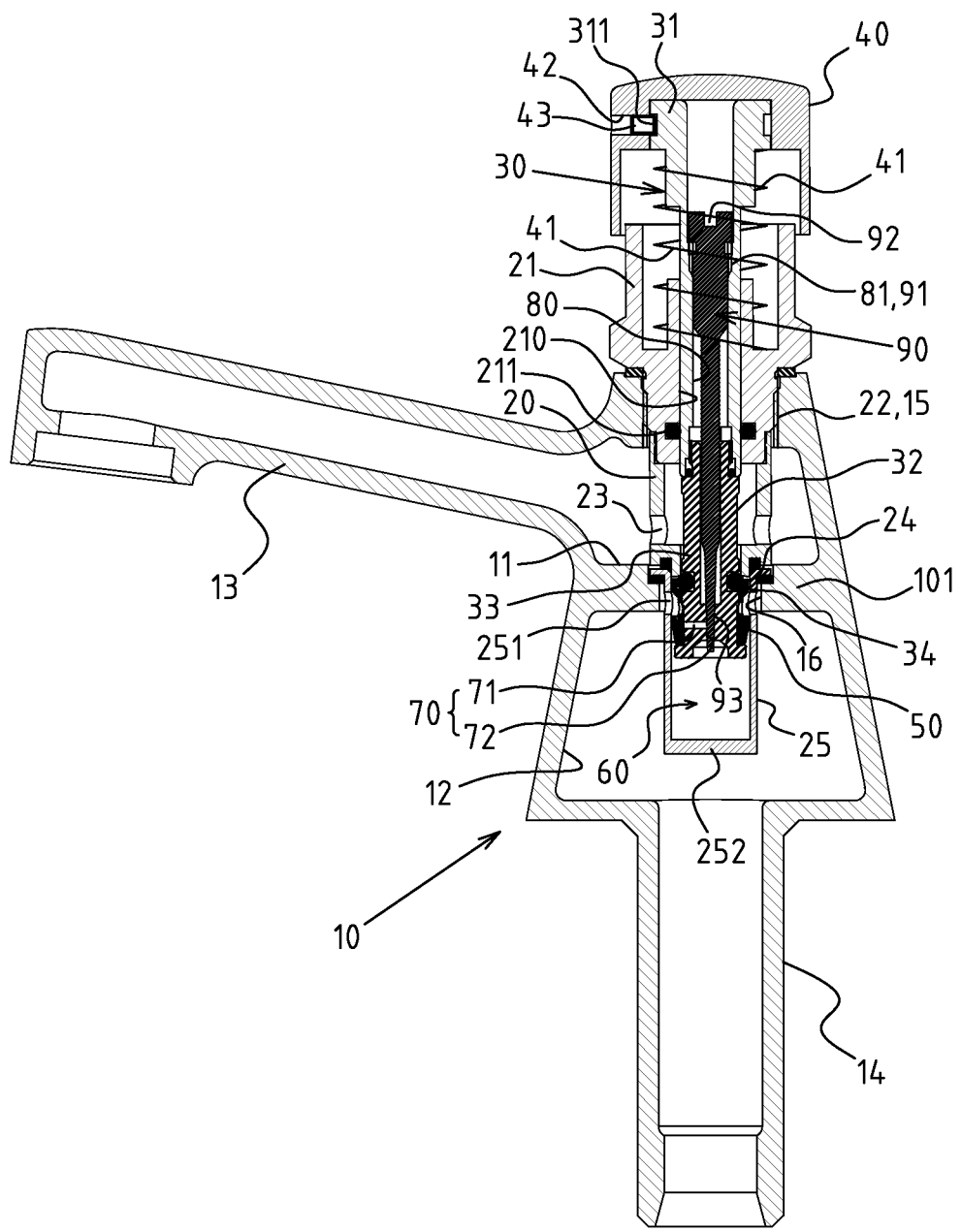
FIG. 3 is an assembled sectional view of the preferred embodiment of the present invention.

FIGS. 1-3 depict preferred embodiments of a push type water tap of the present invention with automatic closing functions, which, however, are provided for only explanatory objective for patent claims.

Said push type water tap includes a main body 10, with its inner space segregated into an upper chamber 11 and a lower chamber 12 via a transverse middle partition 101. An outlet pipe 13 is transversely protruded from one side of the main body 10 and connected with the upper chamber 11. An inlet pipe 14 is extended vertically from the bottom of the main body 10 and connected with the lower chamber 12. Moreover, a screwed hole 15 is set at the top center of the upper chamber 11, while a through hole 16 is set at the center of the transverse middle partition 101.

A through valve tube 20 is set vertically onto the center of the upper chamber 11 of the main body 10. The top of the through valve tube 20 is connected with a lock-joining seat 21, which is provided with a male threaded portion 22 for bolting into the screwed hole 15 of the upper chamber 11; and the lock-joining seat 21 is also provided with a vertical guiding hole 210, into which an O-ring 211 is set. A discharge guiding hole 23 is set laterally onto the through valve tube 20, and a water stop ring flange 24 set at bottom of the through valve tube 20.

A protruding bottom tube 25 is vertically assembled onto the center of the lower chamber 12 of the main body 10. The top of the protruding bottom tube 25 passes through the through hole 16 of the transverse middle partition 101, and then is linked to the bottom of the through valve tube 20. An inlet guiding hole 251 is set laterally onto the protruding bottom tube 25, and a sealing surface 252 set at bottom of the protruding bottom tube 25.

A lifting valve lever 30 contains a top 31, a lever body 32 and a bottom 33. The lever body 32 can be set hoistably into the vertical guiding hole 210 of the lock-joining seat 21 and the through valve tube 20. Air-tight smooth sliding between the lever body 32 and vertical guiding hole 210 can be realized through the setting of O-ring 211. The top 31 is protruded from the top of the lock-joining seat 21, the bottom 33 is extended correspondingly into the protruding bottom tube 25. The bottom 33 is provided with a stop ring 34 that can be abutted onto the water stop ring flange 24 set at bottom of the through valve tube 20 for stopping water supply.

A push button 40 is assembled on the top 31 of the lifting valve lever 30, and also covered externally onto the top of the lock-joining seat 21.

A restoring spring 41 is set between the top 31 of the lifting valve lever 30 and the lock-joining seat 21, and used to support flexibly the lifting valve lever 30 along with the push button 40, namely, enabling upward resettability of the push button 40.

A single-way check ring 50 is sleeved on the periphery of the bottom 33 of the lifting valve lever 30 and elevated simultaneously along with the lifting valve lever 30. The cross section of the single-way check ring 50 has a tapered pattern that keeps contact with hollow wall of the protruding bottom tube 25, thus preventing water from flowing downwards between the bottom 33 of the lifting valve lever 30 and hollow wall of the protruding bottom tube 25.

A resettable regulating space 60 is formed by the gap between the bottom 33 of the lifting valve lever 30 and the sealing surface 252 at bottom of the protruding bottom tube 25.

A resettable regulating water channel 70 is set on the bottom 33 of the lifting valve lever 30, and contains a radial channel 71 and an axial tapered channel 72 interconnected to each other; of which water stream can be guided into the radial channel 71 from the inlet guiding hole 251, and the axial tapered channel 72 is connected downwards with the resettable regulating space 60.

A holding groove 80 is vertically set into the center of the lifting valve lever 30. The upper end of the holding groove 80 penetrates to the top 31 of the lifting valve lever 30, while the lower end of the holding groove 80 penetrates to the bottom 33 of the lifting valve lever 30, and is connected with the axial tapered channel 72 of the resettable regulating water channel 70. Moreover, a female threaded section 81 is set into the holding groove 80.

A flow regulating screw 90 is assembled into the holding groove 80. A male threaded section 91 is set on the flow regulating screw 90 and mated with the female threaded section 81 of the holding groove 80. A tooling slot 92 is set on the top of the flow regulating screw, and a tapered column 93 set on the bottom of the flow regulating screw 90, so as to mate with the axial tapered channel 72 of the resettable regulating water channel 70.

Figure 4:
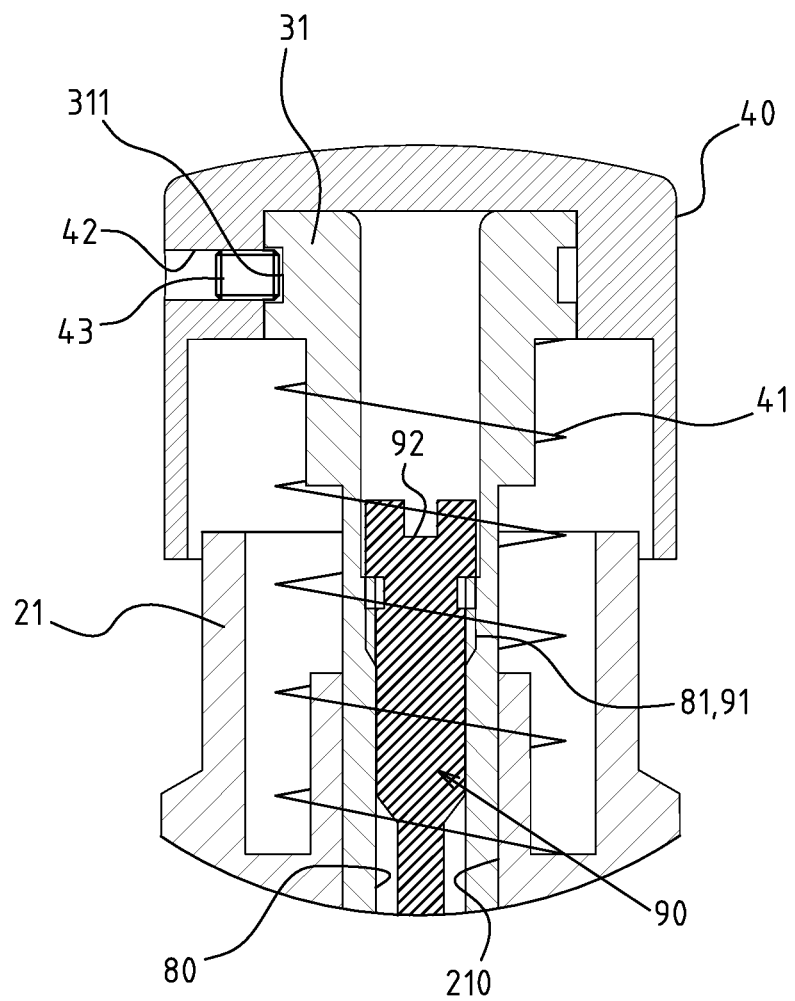
FIG. 4 is an enlarged sectional view of the present invention wherein the push button is mated with the lifting valve lever.

Referring to FIG. 4, a radial through screw hole 42 is set laterally onto the push button 40 for screwing of a sunken bolt 43, such that an annular groove 311 is set correspondingly to the top 31 of the lifting valve lever 30. The inner end of the sunken bolt 43 is inserted into the annular groove 311, such that the push button 40 is assembled on top 31 of the lifting valve lever 30. When it is intended to remove the push button 40, the sunken bolt 43 is just loosened and disengaged from the annular groove 311, so as to release the push button 40.

Of which, the tooling slot 92 set on top of the flow regulating screw 90 has either of straight, cross and hexagonal slots.

Based upon above-specified structure, the present invention is operated as follows:

FIG. 3 shows a schematic view wherein the push type water tap is in a closing state. In such a case, the lifting valve lever 30 along with the push button 40 is braced flexibly by the restoring spring 41. The stop ring 34 on the bottom 33 of the lifting valve lever 30 is abutted onto the water stop ring flange 24 at bottom of said through valve tube 20, so water stream from the inlet guiding hole 251 of the protruding bottom tube 25 cannot flow through, leading to a closing state.

Figure 5:
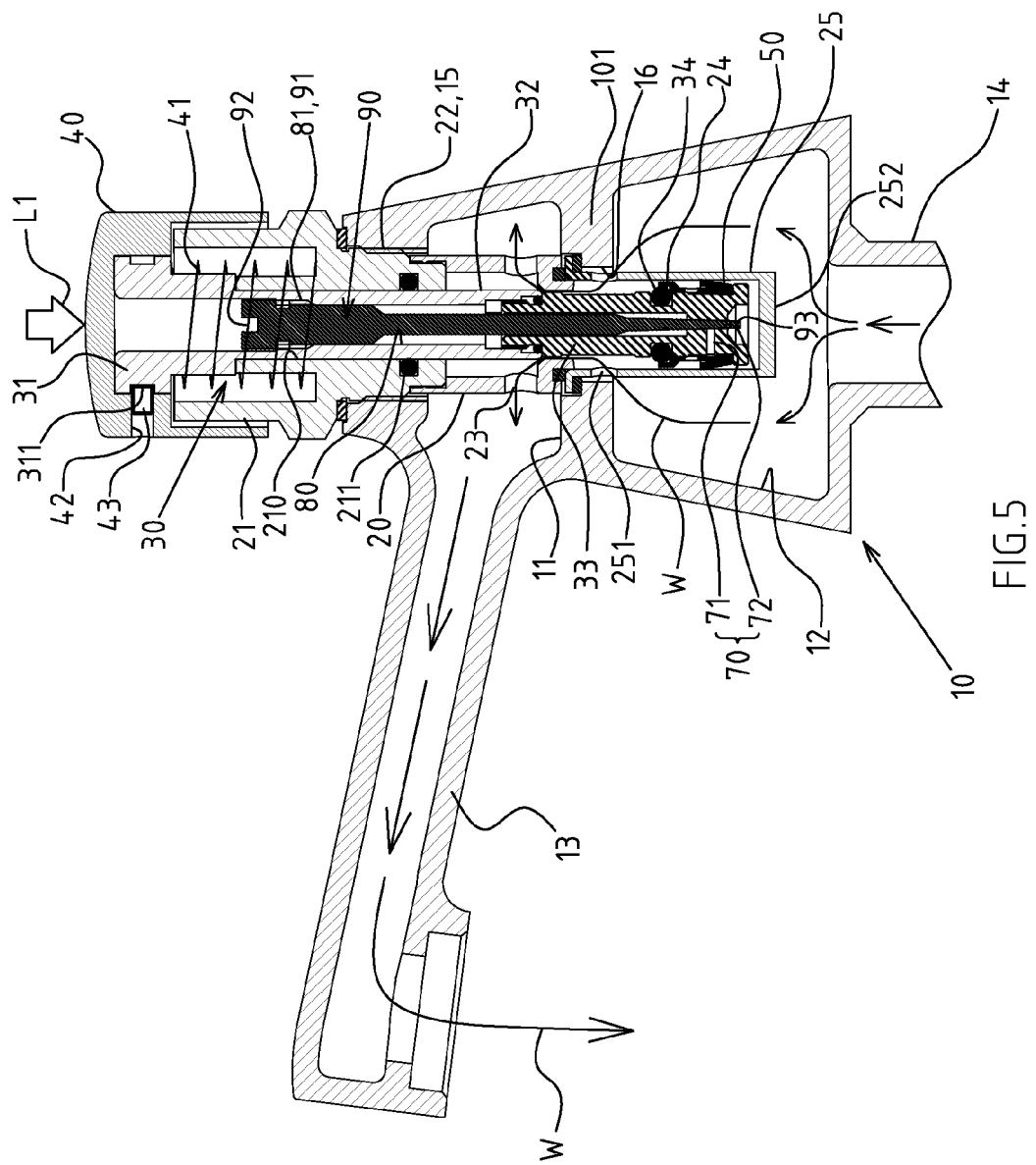
FIG. 5 is a sectional view of the present invention in water supply state.

Referring also to FIG. 5, when it is intended to release water from the push type water tap, the user could press the push button 40 (indicated by arrow L1), driving the lifting valve lever 30 to fall down and press the restoring spring 41 for restoring elastic force. Moreover, the stop ring 34 at the bottom 33 is disengaged from the water stop ring flange 24 of said through valve tube 20. In such a case, water stream W from the inlet guiding hole 251 of the protruding bottom tube 25 passes through the discharge guiding hole 23 laterally set on the through valve tube 20 and enters into the upper chamber 11 of the main body 10, then is discharged from the outlet pipe 13 in a water supply state.

Figure 6:
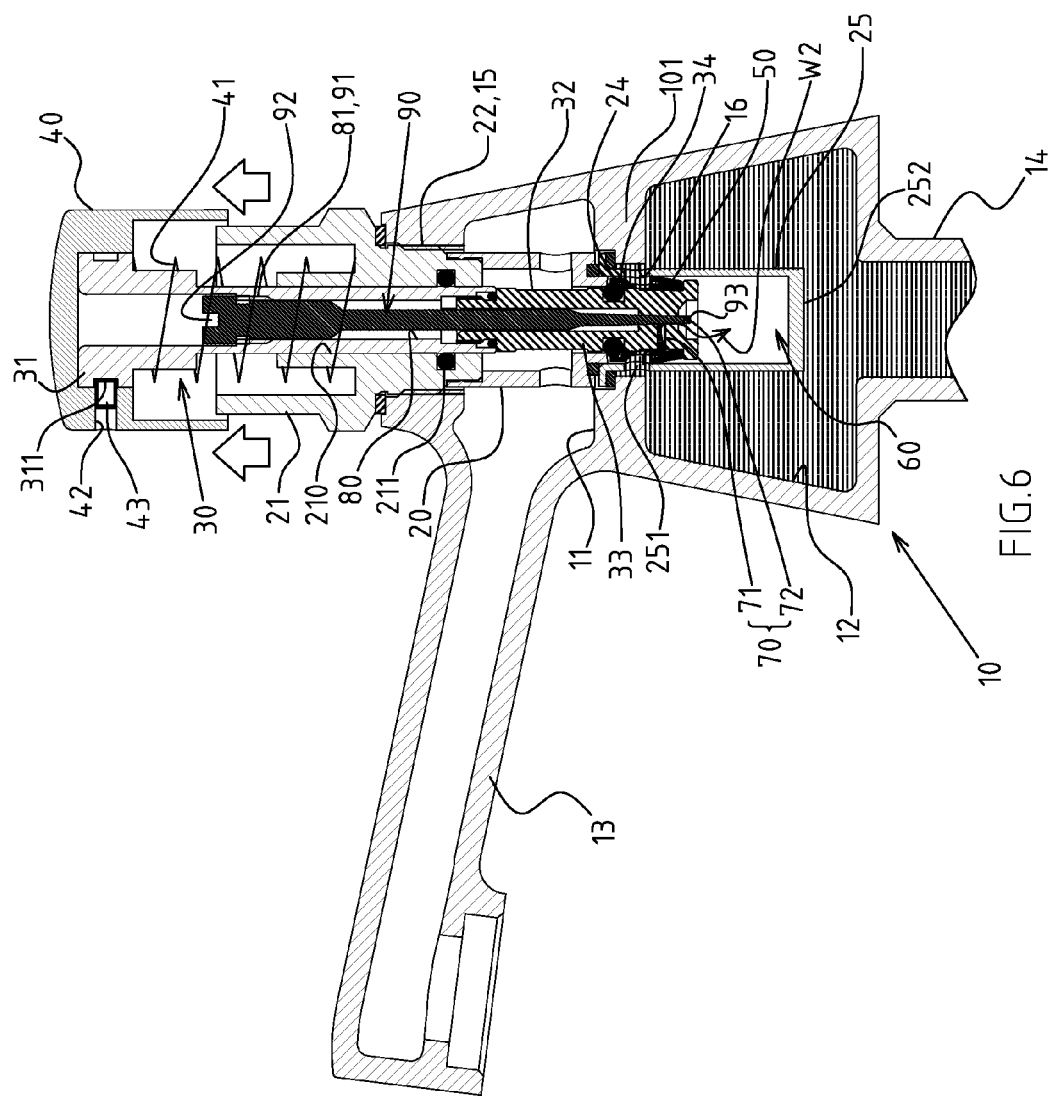
FIG. 6 is a sectional view of the present invention in automatic closing state.

Referring also to FIG. 6, when the user intends to release its pressing of the push button 40, said restoring spring 41 will generate an elastic release force to restore upwards the lifting valve lever 30 along with the push button 40. This motion is not finished instantly, but postponed by the negative pressure of the resettable regulating space 60. Hence, specific water discharge and discharge time are available from the push type water tap to cater to different operating demands.

Figure 7:
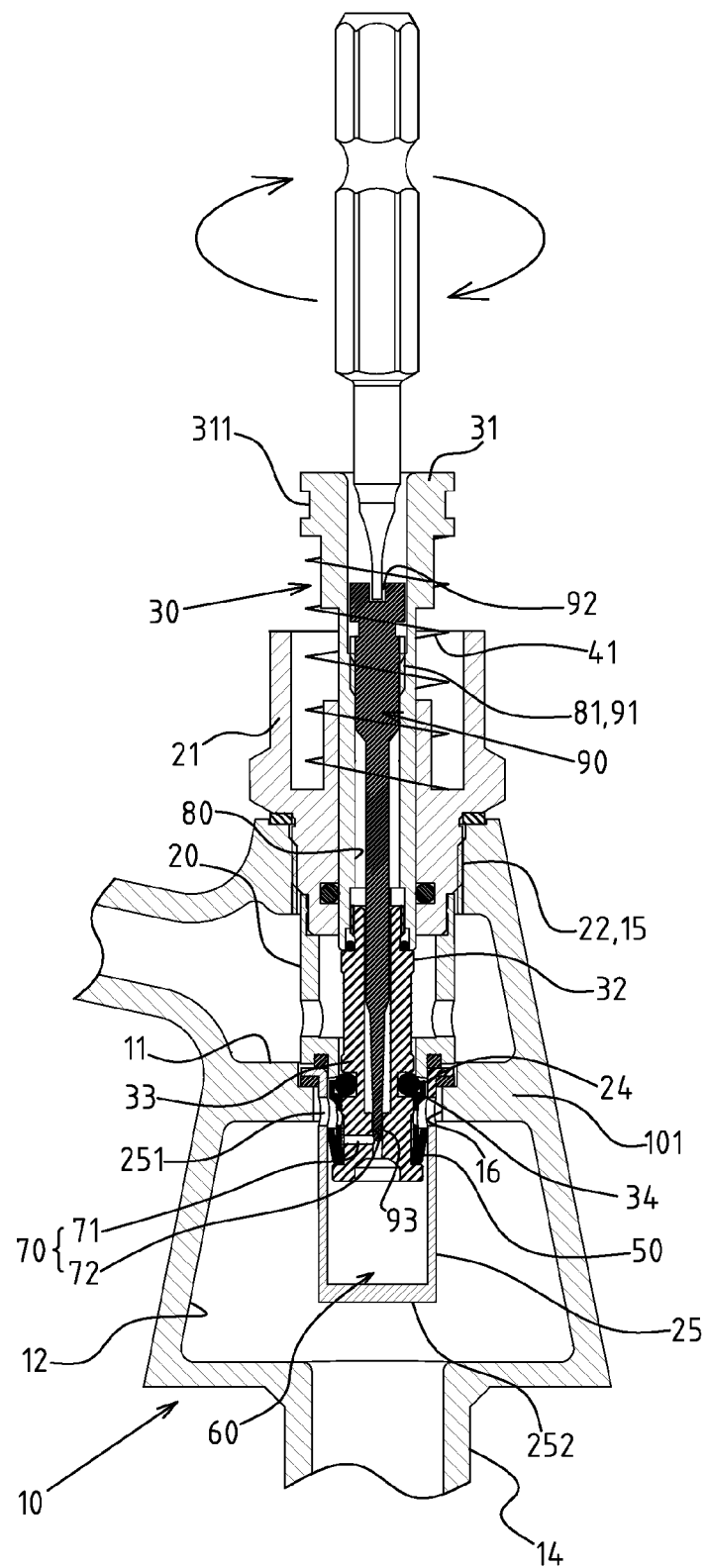
FIG. 7 is a sectional view of the present invention wherein water flow is adjusted.
Figure 8:
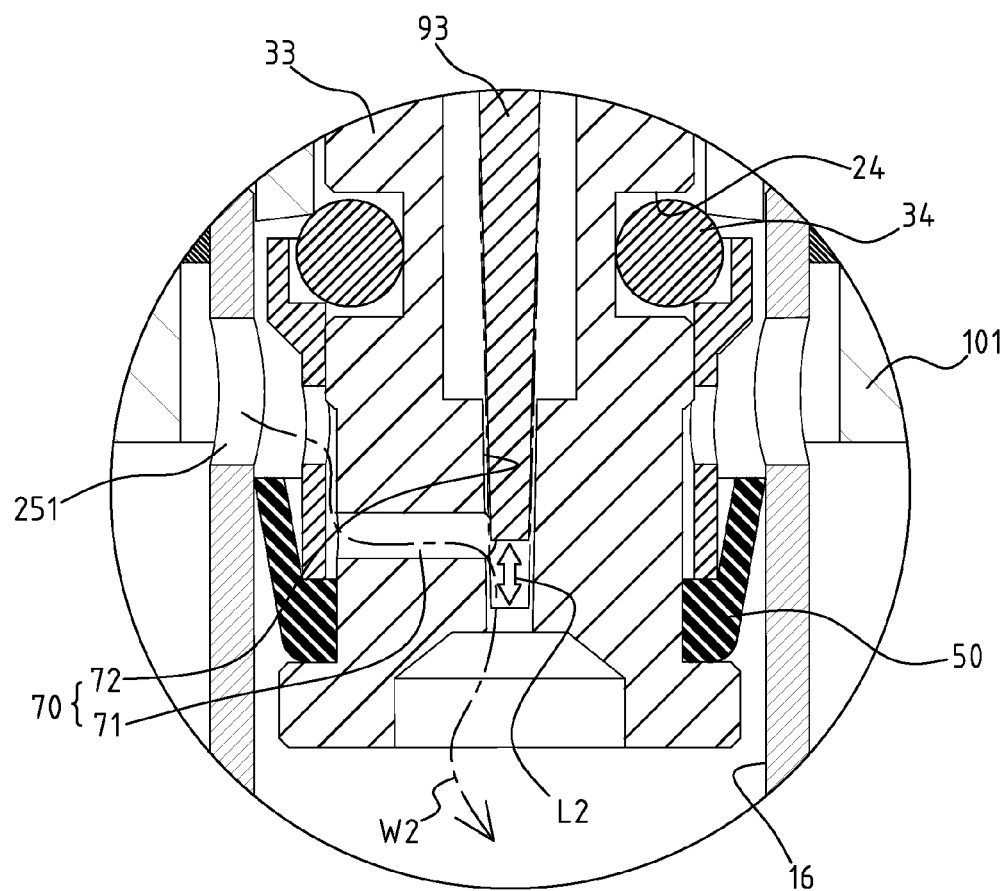
FIG. 8 is an isolated sectional view of the present invention wherein the tapered column at bottom of the flow regulating screw is in hoisting state.

The core aspect of the present invention lies in that the discharge time can be regulated by combining the resettable regulating space 60, resettable regulating water channel 70, holding groove 80 and flow regulating screw 90. Referring firstly to FIG. 6, when the lifting valve lever 30 is braced and restored by the restoring spring 41, a portion of water stream W2 from the inlet guiding hole 251 will pass through the radial channel 71 and axial tapered channel 72 of the resettable regulating water channel 70 to enter into the resettable regulating space 60 (note: with the setting of the single-way check ring 50, water stream from the inlet guiding hole 251 can only reach the resettable regulating space 60 via the resettable regulating water channel 70). Then, water stream W2 filled into the resettable regulating space 60 will form a hydraulic force at bottom of the lifting valve lever 30 for bracing the lifting valve lever 30. The strength of the hydraulic force can be adjusted by hoisting the flow regulating screw 90, as disclosed in FIG. 7. When the push button 40 is removed, a handheld tool 94 (e.g. screwdriver) is inserted from the upper end of the holding groove 80 to the tooling slot 92 at top of the flow regulating screw 90, so as to control rotarily the positive and reverse hoisting state of the flow regulating screw 90. Referring also to FIG. 8, as the tapered column 93 at bottom of the flow regulating screw 90 is mated with the axial tapered channel 72 of the resettable regulating water channel 70, the hoisting position of the tapered column 93 (indicated by arrow L2) may differ. This could change the flux and flow rate of water stream W2 into the resettable regulating space 60 via the resettable regulating water channel 70, thus modifying the lifting speed of the lifting valve lever 30 to adjust water discharge time.

I claim:

1. A push-type water tap having an automatic closing function, the push-type water tap comprising:

a main body having an inner space defining an upper chamber and a lower chamber, said inner space having a transverse middle partition formed between said upper chamber and said lower chamber, said main body having an inlet pipe extending vertically and communicating with said lower chamber, said main body having a threaded hole formed at an upper center of said upper chamber, said transverse middle partitions having a through hole formed in a center thereof;

a through valve tube positioned vertically in a center of said upper chamber of said main body, said through valve tube having a top connected to a lock-joining seat, said lock-joining seat having a male threaded portion threadedly engaged with said threaded hole of said main body, said locking-joining seat having a vertical guiding hole with an O-ring set therein, said through valve tube having a discharge guiding hole set laterally therethrough and a water stop ring flange positioned at a bottom thereof;

a bottom tube positioned vertically into a center of said lower chamber of said main body, said bottom tube having an upper portion extending through said through hole of said transverse middle portion, said bottom tube having a top end linked to a bottom of said through valve tube, said bottom tube having an inlet guiding hole formed laterally therethrough and a sealing surface at a bottom thereof;

a lifting valve lever having a top and a lever body and a bottom, said lever body translatably positioned into said vertical guiding hole of said locking-joining seat and said through valve tube, said top of said lifting valve lever extending from a top of said locking-joining seat, said bottom of said lifting valve lever extending into said bottom tube and having a stop ring abuttable onto said water stop ring flange so as to stop a flow of water;

a push button removably affixed to said top of said lifting valve lever and covering an exterior of said top of said locking-joining seat;

a restoring spring positioned between said top of said lifting valve lever and said locking-joining seat so as to resiliently support said lifting valve lever and said push button;

a one-way check ring sleeved onto a periphery of said bottom of said lifting valve lever so as to move in correspondence with said lifting valve lever, said one-way check ring having a tapered cross-section so as to maintain contact with an inner wall of said bottom tube so as to prevent water from flowing downwardly between said bottom of said lifting valve lever and said inner wall of said bottom tube;

a resettable regulating space defined by a gap between said bottom of said lifting valve lever and said sealing surface of said bottom tube;

a resettable regulating water channel formed at said bottom of said lifting valve lever, said resettable regulating water channel having a radial channel and an axial tapered channel interconnected to each other such that water can be guided into said radial channel from said inlet guiding hole, said axial tapered channel connected downwardly with said resettable regulating space;

a holding groove formed vertically in a center of said lifting valve lever, said holding groove having an upper end extending to said top of said lifting valve lever and a lower end extending to said bottom of said lifting valve lever, said holding groove connected to said axial tapered channel, said holding groove having a female threaded section formed therein; and a flow regulating screw assembled into said holding groove, said flow regulating screw having a male threaded section mated with said female threaded section of said holding groove, said flow regulating screw having a tooling slot formed at a top thereof, said flow regulating screw having a tapered column formed at a bottom thereof, said tapered column having a lower end mating with and positioned within said axial tapered channel of said resettable regulating channel, said tapered column having said lower end adjustably positioned adjacent an end of said radial channel so as to as to control a flow of water through said radial channel.

2. The push-type water tap of claim 1, said push button having a radial screw hole extending laterally through a wall thereof, said lifting valve lever having an annular groove formed adjacent a top thereof, the push-type water top further comprising:

a bolt threadedly received in said radial screw hole, said bolt having an inner end received in said annular groove.

3. The push-type water tap of claim 1, said tooling slot being one of a straight slot, a cross slot, and a hexagonal slot.

* * * * *